(12) United States Patent
Teicher

(10) Patent No.: US 8,700,320 B1
(45) Date of Patent: Apr. 15, 2014

(54) EMPHASIZING FEATURED LOCATIONS DURING A JOURNEY

(71) Applicant: Mordechai Teicher, Hod-Hasharon (IL)

(72) Inventor: Mordechai Teicher, Hod-Hasharon (IL)

( * ) Notice: Subject to any disclaimer, the term of this patent is extended or adjusted under 35 U.S.C. 154(b) by 0 days.

(21) Appl. No.: 13/734,925

(22) Filed: Jan. 5, 2013

Related U.S. Application Data

(60) Provisional application No. 61/725,486, filed on Nov. 13, 2012.

(51) Int. Cl.
*G01C 21/34* (2006.01)

(52) U.S. Cl.
CPC .......... *G01C 21/343* (2013.01); *G01C 21/3476* (2013.01); *G01C 21/3484* (2013.01)
USPC ........... 701/438; 701/439; 701/516; 701/411; 701/424; 340/955.24

(58) Field of Classification Search
USPC ........................................................ 701/438
See application file for complete search history.

(56) References Cited

U.S. PATENT DOCUMENTS

| | | | |
|---|---|---|---|
| 5,717,392 A | 2/1998 | Eldridge | |
| 5,767,795 A | 6/1998 | Schaphorst | |
| 5,906,654 A | 5/1999 | Sato | |
| 6,266,614 B1 | 7/2001 | Alumbaugh | |
| 6,401,034 B1 | 6/2002 | Kaplan et al. | |
| 6,707,421 B1* | 3/2004 | Drury et al. | 342/357.31 |
| 6,708,110 B2 | 3/2004 | Stefan et al. | |
| 6,826,472 B1 | 11/2004 | Kamei et al. | |
| 6,845,321 B1 | 1/2005 | Kerns | |
| 7,463,977 B2 | 12/2008 | Price et al. | |
| 7,853,272 B2 | 12/2010 | Tipnis et al. | |
| 7,962,284 B2 | 6/2011 | Cuititta, II | |
| 8,010,285 B1 | 8/2011 | Denise | |
| 8,019,531 B2 | 9/2011 | Pinkus et al. | |
| 8,175,802 B2 | 5/2012 | Forstall et al. | |
| 8,386,165 B2* | 2/2013 | Kobuya et al. | 701/409 |
| 8,538,677 B2* | 9/2013 | Gutman | 701/400 |
| 2002/0019696 A1* | 2/2002 | Kruse | 701/207 |
| 2003/0182052 A1* | 9/2003 | DeLorme et al. | 701/201 |
| 2004/0104842 A1* | 6/2004 | Drury et al. | 342/357.13 |
| 2005/0049765 A1* | 3/2005 | Chetia et al. | 701/29 |
| 2008/0167798 A1* | 7/2008 | Tertoolen | 701/200 |
| 2008/0228394 A1* | 9/2008 | Fukuda et al. | 701/208 |
| 2009/0319348 A1* | 12/2009 | Khosravy et al. | 705/14.1 |
| 2010/0063726 A1* | 3/2010 | Marjenberg et al. | 701/207 |
| 2010/0125406 A1 | 5/2010 | Prehofer | |
| 2011/0077848 A1* | 3/2011 | Xiao et al. | 701/200 |
| 2011/0082752 A1* | 4/2011 | Dube et al. | 705/14.67 |
| 2011/0125398 A1 | 5/2011 | Bos | |
| 2011/0144904 A1 | 6/2011 | Pinkus et al. | |
| 2011/0153199 A1* | 6/2011 | Morimoto et al. | 701/201 |
| 2013/0245944 A1* | 9/2013 | Rutten et al. | 701/533 |

\* cited by examiner

*Primary Examiner* — Shelley Chen

(57) ABSTRACT

A method and apparatus for presenting audio and/or multimedia descriptions of featured locations to a traveling user, so that descriptions are not replayed in repeated journeys in the same area. When descriptions along a certain route are exhausted in the course of repeated journeys, the user is offered an alternate route in order to visit additional featured locations that have not yet been presented to the user.

16 Claims, 12 Drawing Sheets

EMPHASIZING FEATURED LOCATIONS DURING A JOURNEY

CROSS REFERENCE TO RELATED APPLICATIONS

This application claims the benefit of U.S. provisional patent application No. 61/725,486 filed on Nov. 13, 2012, the contents of which are incorporated by reference in their entirety as if set forth herein.

FIELD

The present disclosure relates to navigation apparatus and methods, and in particular to navigation apparatus and methods providing audio narratives.

DESCRIPTION OF RELATED ART

Global Positioning System (GPS) navigation devices are commonplace. A basic GPS navigation device receives signals from satellites and processes them to determine the geographic coordinates of the device's instant location. Many navigation devices and systems include digital maps and navigation logic for planning driving routes and providing visual and vocal navigation directions. There are standalone navigation devices that do not communicate during navigation; other navigation devices are capable of receiving online traffic updates via Radio Data Systems (RDS), while in still other navigation devices, such as when GPS and navigation functionalities are integrated into a smart phone, some or all of the navigation maps and logic may be hosted by a navigation server that communicates with the navigation device via data networks.

Many users employ a GPS navigation device while walking, driving or cycling. Often, GPS navigation is used to direct a driver toward a new destination, but even when traveling in known and routine areas, a GPS navigation device may still be useful in providing information on traffic conditions, estimated arrival time, or updated driving instruction via alternate routes that take into account current road and traffic conditions.

Many users repeatedly use the same or similar route when traveling, such as when commuting, seeing friends or relatives, or going to frequently-visited places. Routine trips of this sort are typically tiresome and boring, and it would be highly beneficial to make such trips more interesting, entertaining and enriching. This goal is met by embodiments of the present invention.

SUMMARY

Definitions

The following terms are used consistently within the present disclosure and claims. In some instances, the terms defined herein may have a more specific, narrower meaning than in common use or dictionary definitions, in which case the present definitions govern.

The term "user" herein denotes an individual who is employing a navigation device or system to obtain directional instructions during travel. According to various embodiments of the invention, non-limiting examples of a user include: a driver of a vehicle, including, but not limited to a motor vehicle and a bicycle; and a pedestrian.

The term "navigation session" herein denotes a period of time during which the user is navigating according to directional instructions of the navigation device or system.

The term "navigation apparatus" collectively encompasses the terms "navigation device", "navigation system", "navigation device or system" and "navigation server", which herein denote devices and/or systems capable of giving directional instructions to a user journeying from a geographic departure position to a geographic destination position. Navigation apparatus includes, but is not limited to: GPS receivers; smart devices (such as smart phones) with GPS capabilities; and navigation servers on networks (such as cellular networks and the Internet) which provide navigation functionalities including, but not limited to: navigation databases, such as maps, geographic imaging, location finding; and supporting navigation services and applications, such as route planning and generating and providing turn-by-turn navigation instructions.

A "navigation device" is a portable device, carried by hand or placed or installed in a vehicle. A navigation device may be part of a navigation system, may be implemented as a dedicated device, or be a general-purpose portable computing device, such as a smart phone, programmed to execute navigation functionalities. A navigation device includes means (a "location sensor") for identifying its current position, such as a global positioning system (GPS) receiver or other technology used to determine current location. A navigation device may be a standalone device, containing all the necessary components, maps and logic for navigating in a certain geographic area, and/or may communicate online with a remote "navigation server" that includes maps and logic for determining a route and producing navigation directions that are provided online to the navigation device for presentation to the user.

The terms "turn-by-turn instructional navigation", "turn-by-turn navigation instructions" and "turn-by-turn directions" herein denote navigation and directional instructions given to a user for following a route, and may be via audio, graphics, text, pictures, video or any combination thereof. Turn-by-turn navigation instructions include, but are not limited to: directional instructions (e.g., "turn left", "keep to the right", "proceed straight", "go north", "assume a heading of 082 degrees", etc.); speed or velocity (e.g., "proceed at 55 miles per hour", "start driving", "stop", etc.); and navigation advisories (e.g., "hazardous road conditions ahead", "heavy traffic ahead", "you have reached your destination", etc.).

According to various embodiments of the invention, the term "location" herein denotes a pre-defined point, site, region, bounded area, structure, geological feature, etc., on the surface of the earth. Non limiting examples of locations include a street address, a street, a crossroad, a city, a state, a mountain, a lake, a historic landmark, a monument, a shopping mall, a restaurant, a national park, a zoo within a national park, all of the above being specified so that they can be recognized on national or site maps. Some locations may be nicknamed (or "aliased") by users, for example, home, work, my gym, my current location, while still having an equivalent definition recognizable by the public (e.g., a street address).

The term "vicinity" with reference to a location herein denotes either being within the boundaries of a location (e.g.: on a street, in a city, at a national park or a zoo, etc.), being sufficiently proximate to observe the location (e.g., next to a monument, mountain, or lake), or being sufficiently proximate to relate to the location from a reasonable distance (e.g. when being two blocks from the Empire State Building, even if the building is obscured).

The term "route" herein denotes a path traced on the earth surface between an "origin point" ("origin") and a "destination point" ("destination") by a user moving between the two points, regardless of the means of travel. Often, multiple routes may be used to travel between the origin and destination, and the selection of route may depend on factors including, but not limited to: traffic conditions, road conditions and restrictions (e.g., one-way streets); and user personal preferences. The term "along" a particular route with reference to a specific subject (location, site, structure, region, geographical feature, etc.), herein denotes that the subject location lies directly on the route or in the vicinity of a point on the route.

The term "travel choice" herein denotes a choice made by a user during travel which affects the route. In a non-limiting example, a user approaches an intersection and has the ability to turn left, go straight, or turn right. In this example, the user's travel choice determines the next segment of the route of travel. If the user is following a predetermined planned route and is receiving turn-by-turn navigation instructions for following the planned route, a travel choice can modify the route if the user proceeds contrary to the received turn-by-turn navigation instructions, in which case the user's travel choice modifies the route.

The term "database" herein denotes a machine-readable collection of data in any format, including collections of text and collections of images, independent of and regardless of whether or not the collections are sorted, indexed, or keyed.

The term "featured location" herein denotes a geographic location or site which has been selected for presentation or prospective presentation to a user during travel. In various embodiments of the present invention, there are multiple featured locations encompassed by the geographic region in which the user is traveling. According to various embodiments of the invention, a featured location is emphasized to the user via an audio narrative description when the user arrives at, enters, or passes nearby, the featured location during travel in the geographic region. In related embodiments, the audio narrative description is presented to the user by the navigation apparatus which presents directional instructions to the user. In other embodiments, a multimedia description emphasizing the featured location includes presentation elements selected from: audio; video; static graphics; and interactive graphics.

Featured locations according to embodiments of the present invention, may include locations or sites in which the user does not necessarily have a pre-established interest. In this context, some embodiments of the invention emphasize a "featured location" in order to generate a new prospective interest in the user.

A featured location may be commercial or non-commercial, and may be permanent (e.g. a mountain or large body of water) or short-lived (e.g. an exhibition or street fair). Featured locations are associated with information of prospective interest to users of navigation apparatus, non-limiting examples of which include: geographic and historical data, facts and lore associated with the featured location; details about a person or landmark associated with a street or city name; highlights of a current sale in a shopping mall; or highlights of a certain exhibition in an art gallery or museum. According to certain embodiments of the invention, a featured location is associated with a description stored in a featured location database. In related embodiments, the description is an audio narrative; in other embodiments, the description may include a multimedia presentation.

A description associated with a featured location provides information that is specific to the featured location. The term "ephemeral description" herein denotes a short-lived description that is expected to be dropped or replaced by a different description within a short time or upon changing circumstances. Non-limiting examples of ephemeral descriptions include: fresh stories and news; new commercial offerings; or seasonal aspects of a featured location. According to an embodiment of the invention, an ephemeral description is associated with an expiration time/date, which may be either explicit (e.g., ". . . offer expires December 31 . . . ") or implicit (e.g., " . . . today's special is . . . ").

The term "multimedia presentation", herein denotes a user-comprehensible presentation of information in forms including, but not limited to: text, audio, still images, drawing, graphics, and video.

Furthermore, in certain embodiments of the invention, featured locations also encompass geographic locations which are termed as "incidentally associated with" something of prospective interest to the user, thereby connoting lack of a substantive association of the featured location with that subject. In a non-limiting example of being incidentally associated with a location, "Wilson Avenue" in New York City can be a "featured location" that triggers a description related to Woodrow Wilson, although the Avenue is only incidentally associated with Woodrow Wilson and otherwise has nothing substantial to do with Wilson himself.

Moreover, in other embodiments of the invention, the term "featured location" also encompasses large geographic regions. In a non-limiting example, the entire State of Texas could be a "featured location"—users entering Texas could be presented with an audio narrative detailing interesting facts about Texas, such as its geography, history, demographics, etc.

The following expressions, as well as expressions similar thereto, are understood to be interchangeable, and denote that a route includes a point or segment in the vicinity of a certain featured location (as defined above):

"A route passes in the vicinity of a certain featured location",

"a route is in the vicinity of a certain featured location",

"a certain featured location is in the vicinity of a route",

"a route includes a certain featured location",

"a certain featured location is along a route", and

"a route passes through a certain featured location".

Similarly, the following expressions, as well as expressions similar thereto, are understood to be interchangeable, and denote that a user's route passes in the vicinity of a featured location and the user is presented with a description associated with the featured location, without necessarily stopping at the featured location:

A "featured location is visited by a user",

"a user is visiting a featured location", and

"there is a visit to a featured location".

The term "journey" herein denotes a process of a user moving over a route between an origin and a destination, regardless of the means employed. According to certain embodiments of the invention, a journey is made by selecting one of several alternate routes. In a related embodiment, the selection is made by the user. In another related embodiment, the selection is made by the navigation device or system. The phrases "a journey includes a particular featured location", or "a particular featured location is included in a journey", interchangeably denote that the journey's route includes the particular featured location.

BRIEF SUMMARY

FIG. 1 conceptually illustrates the respective domains of turn-by-turn instructional navigation 10 and non-instructional location information 14, according to certain embodiments of the present invention. These domains are both associated with travel and navigation, but they provide different types of information to the user. Turn-by-turn instructional navigation 10 as currently known in the background art provides directions to the user for following a route, as described previously. Non-instructional location information 14 according to embodiments of the present invention provides facts, stories and/or timely news pertaining to featured locations in the vicinity of the user's travel, to enhance and enrich the user's travel experiences. Coordination 12, as provided by embodiments of the present invention, ensures that non-instructional location-based information 14 is presented to the user in a manner that complements turn-by-turn instructional navigation 10 without interfering.

Embodiments of the present invention provide apparatus and methods for enhancing the user experience during travel, particularly for repeated journeys within a specific geographic area. According to various embodiments of the invention, users are presented with audio narrative descriptions and/or other multimedia descriptions of featured locations when they enter or pass such locations. In some embodiments of the invention, the user is encouraged to alter the traveled route in order to pass by one or more featured locations in alternative routes for which appropriate narrative descriptions are available. Certain embodiments of the invention provide variety by avoiding repetition of previously-presented narrative descriptions. Other embodiments of the invention adapt the selection of featured locations and their narrative descriptions to personal preferences of the users.

Certain embodiments of the present invention relate to the use of navigation apparatus for following a pre-planned route, in which the navigation apparatus provides continuous turn-by-turn navigation instructions to the user during travel along the route. In related embodiments, audio descriptions of featured locations are interspersed between and among turn-by-turn navigation instructions.

Other embodiments of the present invention relate to the case when the user is familiar with the route and does not require turn-by-turn navigation instructions, and is using the method described hereinbelow principally for the audio descriptions of featured locations.

Still other embodiments of the present invention relate to the use of navigation apparatus when the user is exploring an unfamiliar area without having any destination in particular, and is using the method described below principally for the audio descriptions of featured locations and/or for location information when desired, and/or to be available when the user decides to proceed to a specific destination. There is not necessarily a planned route in these embodiments, but there is still a route associated with the travel—the route determined by the user's travel choices while traveling.

According to an embodiment of the present invention, there is provided a computerized navigation method, implemented by one or more processors (such as a processor of navigation device and/or a processor of a navigation server), for providing directional instructions to a specific user during a journey that includes at least one featured location, each of which is associated with at least one description stored in a featured location database.

The term "specific user" herein denotes a particular user who is distinguished from users in general. In an embodiment of the present invention, each user is provided with a unique user ID in order to identify specific users.

The term "audio clip" herein denotes a short audio recording in a machine-readable format for playback on a user device. In a non-limiting example, a short audio clip ranges in duration up to 15 seconds. In another non-limiting example, a medium audio clip ranges in duration from 16 seconds to 30 seconds. In a further non-limiting example, a long audio clip lasts more than 31 seconds.

The method of the aforementioned embodiment starts with receiving an origin point and a destination point of a journey. In a non-limiting example, the origin point can be the current geographic position of a user's navigation device, such as computed via the GPS. In certain embodiments, the destination point is received by a navigation device from a user through the navigation device's user interface. In other embodiments, the destination point is received by a navigation server from a navigation device.

The method of the aforementioned embodiment continues with developing a planned route between the origin point and the destination point. The term "planned route" herein denotes that a particular developed route is distinguished from routes in general. Then the method continues with constructing a featured location set containing at least one selected featured location, where the term "selected featured location" herein denotes that a particular featured location is distinguished from featured locations in general.

According to this embodiment, each selected featured location of the set is included in the planned route and is associated with a featured location description retrieved from a featured location database. A featured location description is preferably selected from the featured location database such that the selected description has not previously been presented to the specific user, or has been presented a long time ago. In an embodiment of the present invention, each featured location description is identified by a unique featured location description ID, and descriptions presented to the specific user are recorded in a travel history log of that specific user.

By checking the travel history log, it is possible to discover if a particular featured location description has already been presented to the specific user, enabling the system to present a featured location description to the specific user which has not previously been presented, thus avoiding repetition of presented descriptions. With respect to certain embodiments of the invention, the term "recorded" in the context of a travel history log herein denotes that a reference to a specific presentation of a description to a user appears as a data item in the travel history log. In a related embodiment, the reference recorded in the travel history log is the description's unique "featured location description ID". In another related embodiment, where a featured location has only one description in the featured location database, the reference recorded in the travel history log can be just the "featured location ID", which for example may be the featured location's geographic coordinates.

In some embodiments, the record of a presentation of a description in the travel history log is time-stamped. In a related embodiment, a description that has already been presented to the user may be presented again to the same user after a predetermined amount of time has elapsed (e.g., six months, one year, etc.), as determined from the time-stamp.

The method continues for each featured location in the featured location set:
  retrieving from the featured location database a description associated with the featured location which has not been recorded in the user's travel history log(to avoid repetition, as disclosed above);
  providing the retrieved description for presentation to the user, (such as by providing the retrieved description from a server to a navigating device, or providing the retrieved description from a processor of a navigation device to the audio transducer of the navigation device for presentation); and recording the unique featured location description ID in the user's travel history log, to avoid repeating the same description to the user in the future, at least within a predefined period of time.

As previously noted, the travel history log is specific to the particular user. In some embodiments of the invention, the travel history log is stored with the user's profile in a navigation server. In other embodiments the travel history log is stored in the user's navigation device.

The method disclosed above does not preclude providing additional information for presentation to the user during travel, such as turn-by-turn navigation instructions, navigation advisories related to the route, and/or points of interest, traffic news, general news, etc.

In an embodiment of the invention, a particular featured location may be associated with only a single description in the featured location database, and therefore so long as there is only that single description in the database, this particular featured location is preferably presented only once to the user. According to this embodiment, however, in the event that one or more additional descriptions of the particular featured location are added to the featured location database, those additional descriptions are eligible for additional presentation, in keeping with the goal of continually providing the user with new interest during journeys. In addition, certain featured locations may be associated with ephemeral descriptions that are updated from time to time, further providing additional presentations.

In certain embodiments, the user enters preferences regarding the presentation of information associated with featured locations, including, but not limited to:
  specific featured locations;
  categories of featured locations (e.g., commercial featured locations, historical featured locations, etc.);
  minimum/maximum number and frequency of presentations (per time and/or per distance) during a journey.

According to certain embodiments of the invention, the term "presentable description" denotes a featured location description for which there is no recorded reference in the user's travel history log (i.e., has not previously been presented to the user), or the featured location has not been presented to the user at all in the past, or the description has been presented a long time ago. According to other embodiments, a presentable description also complies with at least one predetermined preference of the user. According to certain embodiments of the invention, a navigation device and/or navigation system selects featured locations such that each selected featured location has at least one presentable description. The term "presentable featured location" herein denotes a featured location having at least one presentable description.

It may happen that a route selected according to map and traffic conditions does not include a sufficient number of presentable featured locations to match the user's preferences for a minimum number of presented featured locations. In such a case, a related embodiment of the invention allows for the user to specify a predetermined "route extension tolerance" (for example, "up to ten extra miles but not more than fifteen extra minutes"), for creating an alternate route that offers a sufficient number of presentable featured locations, such that the alternate route does not cause the route extension tolerance to be exceeded. This embodiment offers the user not only interesting information about his or her route, but also encourages exploring and getting to know new routes and featured locations that could otherwise remain unknown to the user.

Certain embodiments of the present invention handle cases where the user desires only a single visit to a featured location, regardless of the number of descriptions associated with the featured location (or the update/replacement of an ephemeral description). This situation may arise, for example, when the user prefers to visit each presented featured location only once in the interests of visiting the greatest variety of featured locations in a limited amount of time (e.g., the user is a tourist on holiday vacation). A similar condition occurs, for example, when the featured location database includes only a single description for a featured location and the description is permanent. These embodiments of the invention therefore provide only a single visit to a featured location, regardless of the number of descriptions available in the featured location database for the featured location. In related embodiments, the travel history log records identifiers of featured locations in addition to, or instead of, descriptions identifiers.

Embodiments of the present invention also provide navigation apparatus for executing the methods disclosed above. Related embodiments provide a navigation server that executes the methods disclosed above. Further related embodiments provide a navigation device that executes the methods above. Still further embodiments provide a navigation system including both a navigation server and a navigation device for cooperatively executing the methods disclosed above.

BRIEF DESCRIPTION OF THE DRAWINGS

The present invention will be more fully understood from the following detailed description of the embodiments thereof, taken together with the drawings in which.

DETAILED DESCRIPTION

The principles and operation of navigation emphasizing featured locations according to embodiments of the present invention may be understood with reference to the drawings and the accompanying description.

Figure 2:
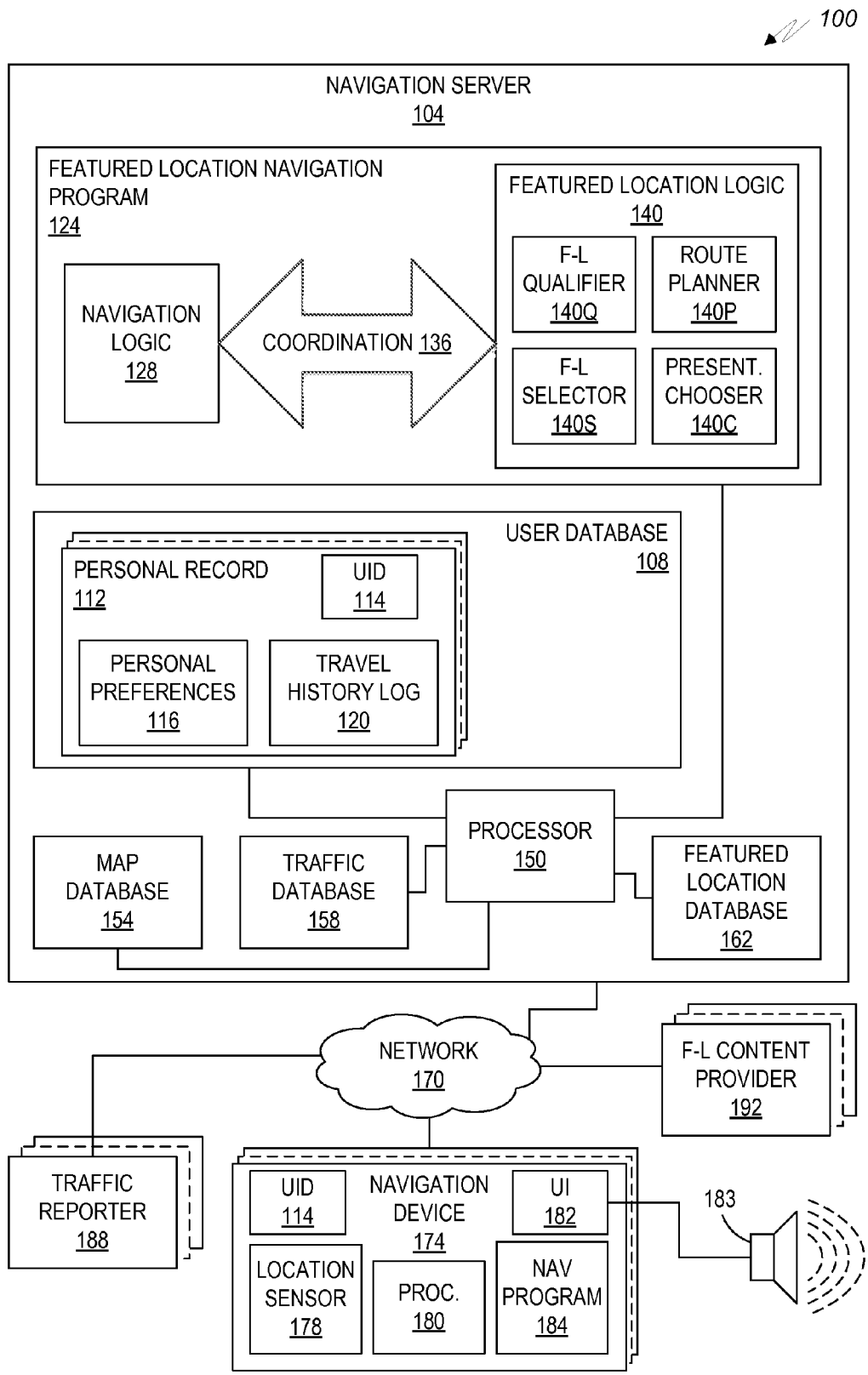
FIG. 2 conceptually illustrates a featured location navigation system according to an embodiment of the present invention.
Figure 3:
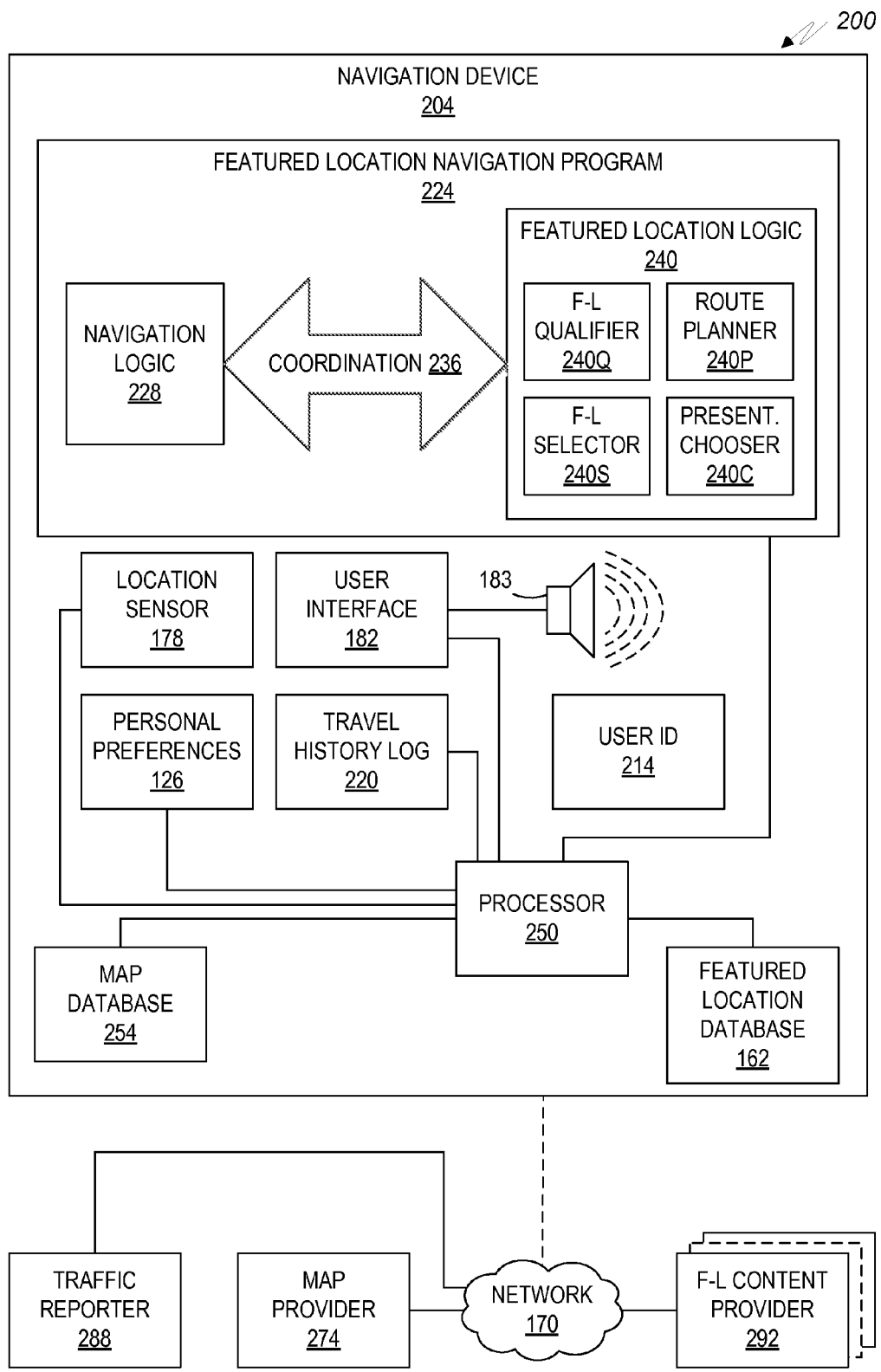
FIG. 3 conceptually illustrates a featured location navigation device according to an embodiment of the present invention.

Certain embodiments of the present invention, as illustrated in FIG. 2 and described below, implement a system based on a server which connects via a network to a portable navigation device of the user. Other embodiments of the invention, as illustrated in FIG. 3 and described below, are based on a stand-alone portable navigation device of the user, which can optionally connect via a network to server-provided resources.

Server-Centric System

FIG. 2 conceptually illustrates a server-centric navigation system 100 according to an embodiment of the present invention, in which components related to presentation of featured locations are implemented via a navigation server 104, while a user navigation device 174 serves principally to determine the user's geographical location and to provide a user interface.

Navigation server 104 includes, in a nonvolatile storage device, a user database 108 where each user has a personal record 112. Personal record 112 includes a user ID ("UID") 114 that uniquely identifies the respective user of personal record 112, personal preferences 116 (discussed with reference to FIG. 5 below) and a travel history log 120 (which can be implemented via a database or a text file), which chronologically records visits to featured locations and the presented descriptions stored in a featured location ("F-L") database 162. According to certain embodiments of the invention, a visit is logged (recorded) in travel history log 120 in the form of a unique identifier of the presented description (from featured location database 162) that is provided by system 100 at the visited featured location, and, in related embodiments, also includes an identifier of the featured location itself, and, optionally, also a timestamp of the respective presentation. Featured location navigation program 124 includes, in a nonvolatile storage device, executable code to be run on a processor 150 for performing methods according to embodiments of the invention as disclosed herein. Featured location navigation program 124 includes navigation logic 128 that is similar to the navigation logic of conventional navigation servers, as well as featured location logic 140 that identifies the featured locations to be visited by the user, along with descriptions associated with the featured locations to be presented to the user when visiting the respective featured locations. According to certain embodiments of the invention, featured location logic 140 includes modules such as a featured location qualifier 140Q, a route planner 140P, a featured location selector 140S, and a presentation chooser 140C. Featured location navigator program 124 also includes coordination logic 136 that determines how navigation logic 128 and featured location logic 140 work together and coordinate with one another. In a non-limiting example, the presentation of a featured location to the user by featured location logic 140 does not interfere with directional instructions generated by navigation logic 128; in another non-limiting example, a desired presentation of a certain featured location by featured location logic 140 directs navigation logic 128 to issue directional instructions to the user in order to pass in the vicinity of that featured location. A map database 154 and a traffic database 158 are similar to their counterparts in other server-based navigation systems and provide data used by navigation logic 128 for calculating routes and generating directional instructions to the user, while featured location database 162 includes coordinates of featured locations and descriptions thereof to users. Processor 150 includes one or more processors and all components and circuits needed to carry out the storage, processing and communication functionalities of navigation server 104 according to embodiments of the invention. Navigation server 104 may physically extend over several physical servers, each storing part of the data and/or executing part of the processes.

A network 170 connects multiple navigation devices (such as device 174) with navigation server 104. Since navigation device 174 is mobile, network 170 may include one or more cellular data networks, the Internet, Radio Data System (RDS), and/or other wired or wireless networks. Network 170 also serves communication between traffic reporters 188 and navigation server 104, as well as between a featured location content provider 192 and navigation server 104.

Navigation device 174 is a personal mobile unit of a user, carried by hand or placed in, installed or attached to a vehicle such as a car, bicycle or boat. According to various embodiments of the invention navigation device 174 has a unique user ID 114 that associates navigation device 174 with personal record 112 in user database 108 of navigation server 104. A user interface 182 includes input and output means that allow the user to enter destination data, preferences and other data and receive directional instructions and featured location descriptions. Associated with user interface 182 is an audio transducer 183 for providing audible descriptions to the user. In an embodiment of the invention, audio transducer 183 is a speaker; in another embodiment audio transducer 183 is a headphone/earphone. A location sensor 178 determines the current geographic location of navigation device 174 via an appropriate means, including, but not limited to: the Global Positioning System (GPS); cellular tower data; and electronically reading and interpreting road signs or other signs. Processor 180 executes a navigation program 184 for sending current location data and user commands and preferences to navigation server 104, and for receiving directional instructions and featured location descriptions from navigation server 104, and to present such directional instructions and description to user via user interface 182.

Traffic reporter 188 is a device or server that provides real-time traffic information data to traffic database 158. Real-time traffic information may be provided by commercial and non-commercial agencies, and may also be derived by navigation server 104 from dynamic location information of numerous active units of navigation device 174 or other active navigation devices. Featured location content provider 192 may be an individual, a public entity, or a non-profit or commercial agency, that provides information related to at least one featured location, to be stored in featured location content database 162. For example, a knowledgeable person may provide information that relates to historical landmark, a city may provide information about city attractions, and a commercial entity may provide information about a shopping mall, stores, or special offers.

It will be noted that navigation device 174 may be a dedicated navigation device, or form part of another, multi-purpose mobile device, such as a smart phone, which may include also many other functionalities that are not shown in FIG. 2.

Navigation Device-Centric System

FIG. 3 describes a navigation device-centric system 200 according to an embodiment of the present invention, in which components related to presentation of featured locations are implemented via a navigation device 204.

Navigation device 204 is a personal mobile unit of a user, carried by hand or placed in, installed or attached to a vehicle such as a car, bicycle or boat. It is identifiable by user ID ("UID") 214 to identify associate navigation device 204 to other devices on network 170. User interface 182 includes input and output means that allow the user to enter destination data, preferences and other data and receive navigation directions and featured location descriptions. Location sensor 178 determines the current location of navigation device 204 as previously described. A processor 250 executes a featured location navigation program 224 in a manner similar to that disclosed previously for server-centric navigation system 100 as shown in FIG. 2.

A traffic reporter 288 provides real-time traffic information data to processor 250. Real-time traffic information may be provided by commercial and non-commercial agencies, and may also be derived by a navigation server 204 of FIG. 2. A featured location content provider 292 may be an individual, a public entity, or a non-profit or commercial agency, that provides information related to at least one featured location, to be stored in featured location database 162. In non-limiting examples, a knowledgeable person may provide information that relates to historical landmark, a city may provide information about city attractions, and a commercial entity may provide information about a shopping mall, stores, or special offers.

Navigation device 204 may be a dedicated navigation device, or form part of another, multi-purpose mobile device, such as a smart phone, which may include also many other functionalities not shown in FIG. 3.

Similar to the server-centric navigation system as previously disclosed, featured location navigation program 224 includes navigation logic 228 that is similar to the navigation logic of conventional navigation devices, as well as featured location logic 240 that determines the featured locations to be visited by the user, along with descriptions associated with the featured locations to be presented to the user when visiting the respective featured locations. According to certain embodiments of the invention, featured location logic 240 includes modules such as a featured location qualifier 240Q, a route planner 240P, a featured location selector 240S, and a presentation chooser 240C. Featured location navigator program 224 also includes coordination logic 236 that determines how navigation logic 228 and featured location logic 240 work together and coordinate with one another. Also included in navigation device 204 are a travel history log 220, a map database 254, and featured location database 162.

Navigation device 204 is optionally connected to network 170, which connects navigation device 204 to a traffic reporter 288, a map provider 274, and a featured location content provider 292.

Figure 4:
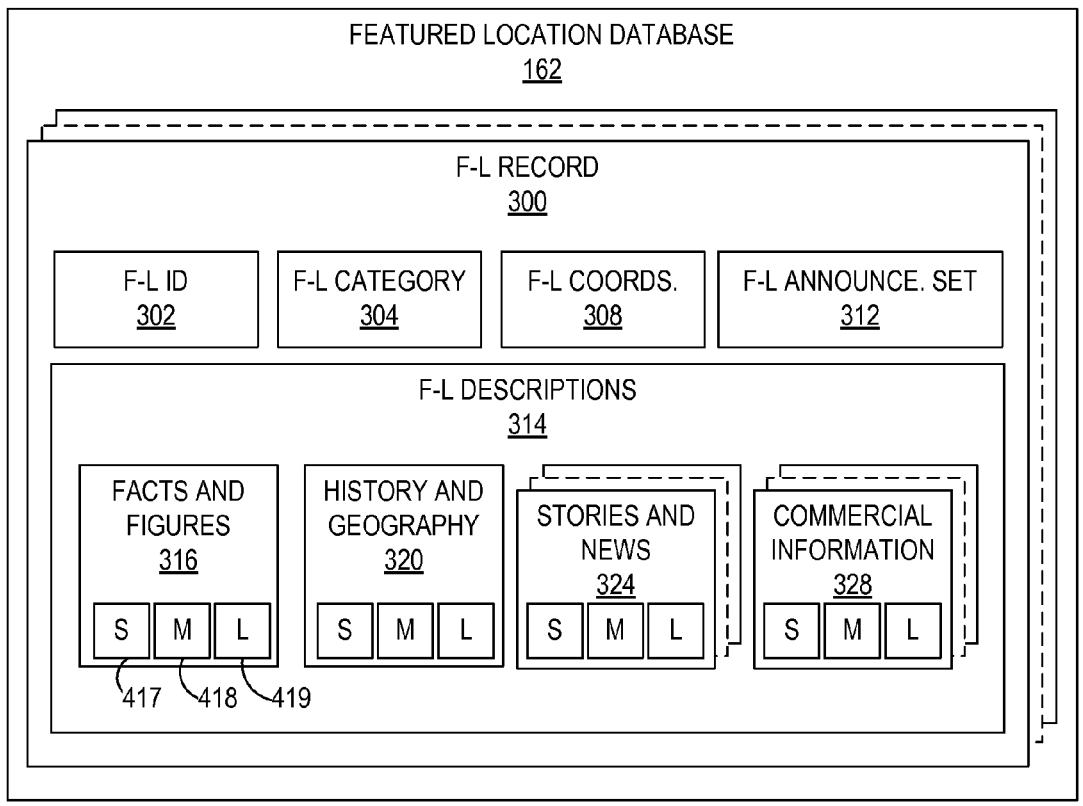
FIG. 4 conceptually illustrates a featured location database and records thereof according to an embodiment of the present invention.

FIG. 4 conceptually illustrates a featured location database 162 and a featured location ("F-L") record 300 thereof according to an embodiment of the present invention. Included are a unique featured location ID 302, a featured location category 304, featured location geographic coordinates 308, and a featured location announcement set 312 (See FIG. 10 below).

Featured location descriptions 314 include, but are not limited to: facts and figures 316, history and geography 320, news and stories 324, and commercial information 328. In some embodiments of the present invention, featured location descriptions 314 are audio narrative descriptions. In a related embodiment, a given description can have several versions depending on the time duration (e.g., in seconds) of the audio narrative: a short description 417, a medium description 418, and a long description 419. In an embodiment, similar descriptions for a particular featured location may be prepared for several lengths to accommodate different time intervals between predicted navigation instructions, as discussed below in the section "Coordinating with Navigation".

Figure 1:
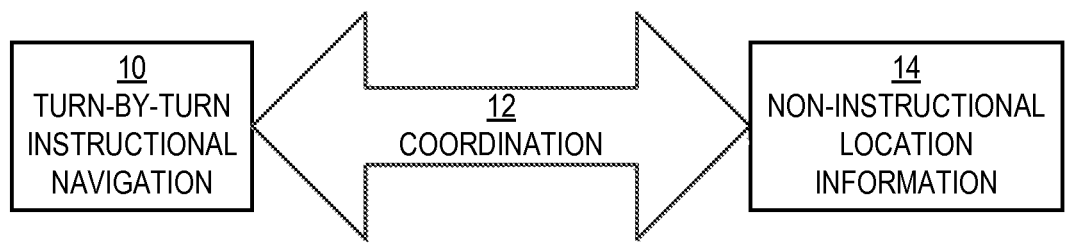
FIG. 1 conceptually illustrates the respective domains of turn-by-turn instructional navigation and non-instructional location-based information, according to certain embodiments of the present invention.
Figure 5:
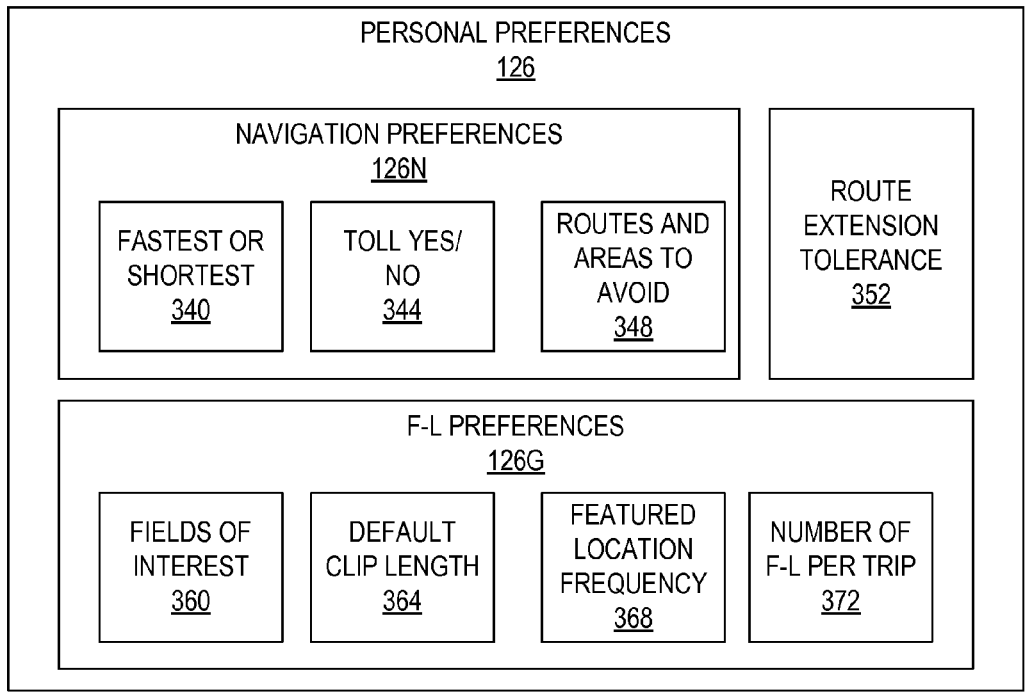
FIG. 5 conceptually illustrates a user personal preferences data structure according to an embodiment of the present invention.

FIG. 5 conceptually illustrates a user personal preferences data structure 126 according to an embodiment of the present invention. Navigation preferences 126N are used in coordination with turn-by-turn instructional navigation (12 in FIG. 1, 136 in FIG. 2, and 236 in FIG. 3), and include, but are not limited to: a preference 340 for fastest route vs. shortest route; a preference 344 for toll vs. non-toll roads; a preference 348 for routes and areas to avoid; and a route extension tolerance 352 as herein described for preparing alternative routes that will enrich the driving experience. Featured location preferences 126G include, but are not limited to: a preference 360 for fields of interest; a default audio clip length preference 364, for specifying the preferred length of description audio clips, e.g., short description 417, medium description 418, or long description 419 (FIG. 4); a preference 368 for the frequency of featured location descriptions while traveling; and a preference 372 for the min/max number of featured locations per trip.

Figure 6:
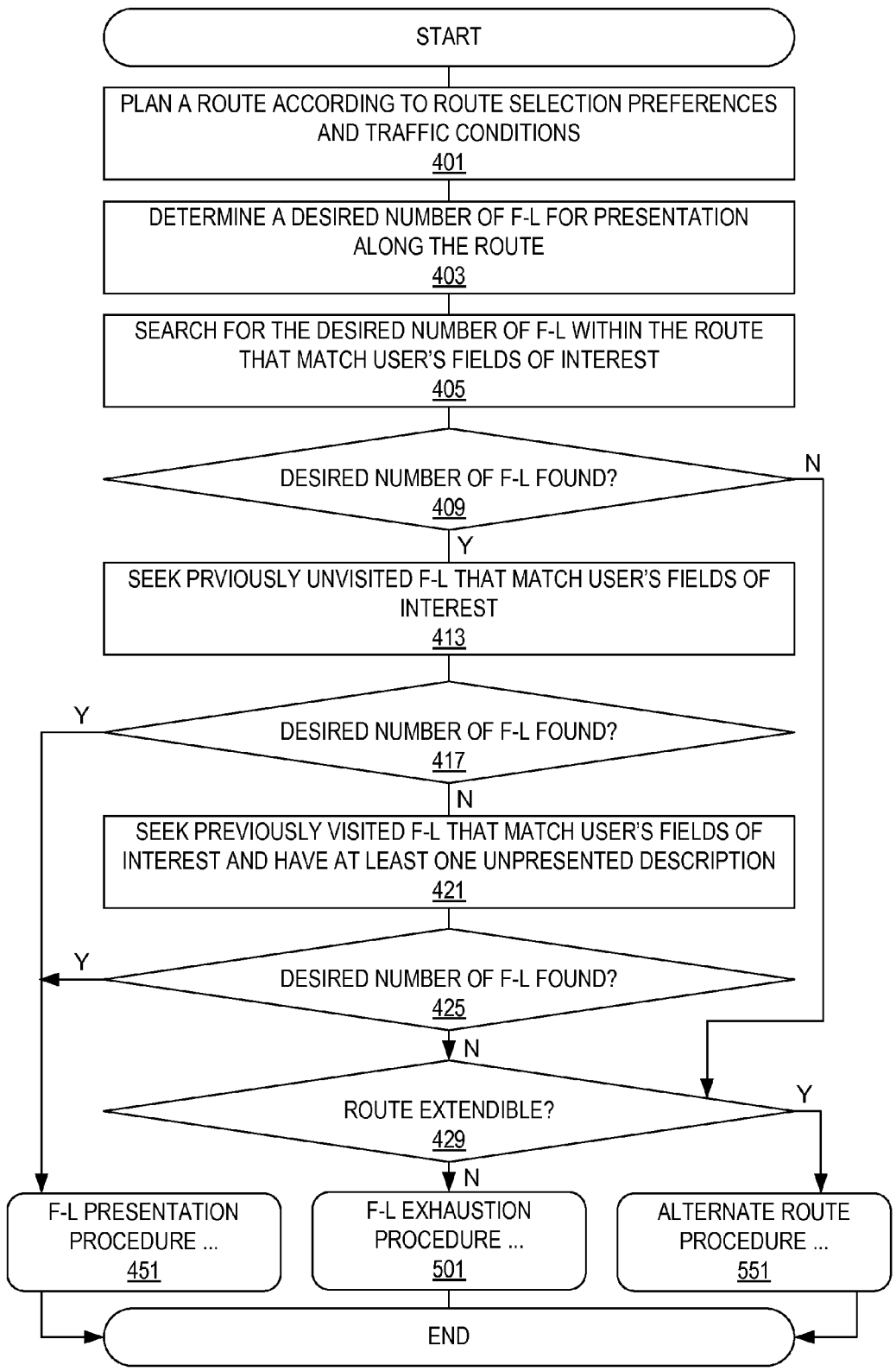
FIG. 6 illustrates a method according to an embodiment of the present invention for presenting a featured location description.
Figure 7:
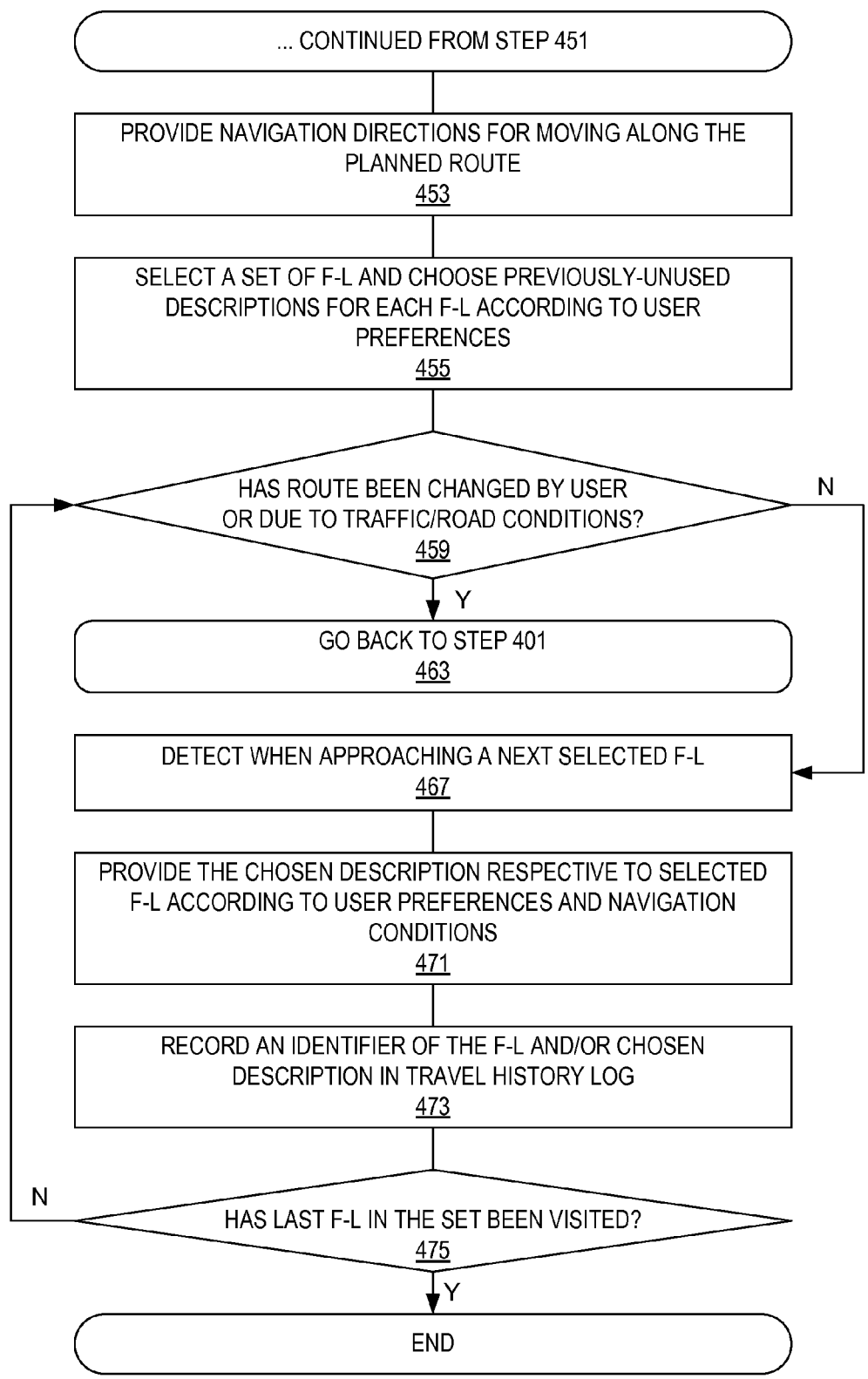
FIG. 7 illustrates an extension of the method shown in FIG. 6 according to another embodiment of the present invention.

FIG. 6 illustrates a method according to an embodiment of the present invention for presenting a featured location description. The method starts at a step 401 in which a route between an origin location (usually, the current location) and a target location is planned according to user route selection preferences and traffic conditions. Next, in a step 403 a desired number of featured locations is determined for presentation along the route according to user preferences, and in a step 405 a search is conducted on the route to find featured locations which match the user's fields of interest. If the desired number is not found, then a decision point 409 continues to a decision point 429 for alternative routing, as described below. If, however, the desired number is found, then decision point 409 proceeds with a step 413, which searches for previously unvisited featured locations among the already-found featured locations. If the desired number of previously unvisited featured locations is found, then a decision point 417 concludes the method with a step 451 for presenting the featured location descriptions (FIG. 7, detailed below). If the desired number of previously unvisited featured locations is not found, however, then decision point 417 proceeds to a step 421 which finds previously-visited featured locations which have descriptions that were not previously presented to the specific user. If the desired number of featured locations is found, a decision point 425 concludes with step 451. Otherwise, if the desired number of featured locations is not found, a decision point 429 checks to see if the route is extendible, in which case an alternate route procedure 551 is executed (FIG. 9, detailed below). If the route is not extendible, an exhaustion procedure 501 is executed (FIG. 8, detailed below).

FIG. 7 illustrates an extension of the method shown in FIG. 6 and described above, according to an embodiment of the present invention, following step 451 (FIG. 6). In a step 453, turn-by-turn navigation directions are provided for moving along the planned route. In a step 455, a set of featured locations is selected, and for each of the featured locations in the set a description is chosen such that each description has not been presented previously to the user, and each description complies with user preferences. At a decision point 459, if the route has been changed by user request or in response to road or traffic conditions, a step 463 returns to step 401 of the main method (FIG. 6). If the route has not been changed, however, a step 467 detects when the user is approaching the next featured location in the set. Then, in a step 471, the chosen description of the approached featured location is presented to the user according to the user's preferences and turn-by-turn navigation conditions. In a step 473, an identifier of the description is recorded in the user's travel history log. In another embodiment of the present invention, there is only a single description for the featured location, and an identifier of the featured location is recorded in the user's travel history log. In still another embodiment, both the identifier of the description and the identifier of the featured location are recorded in the user's travel history log. Finally, at a decision point 475, if there are additional featured locations, the method returns to decision point 459. If there are no additional featured locations for the route, the method concludes.

Figure 8:
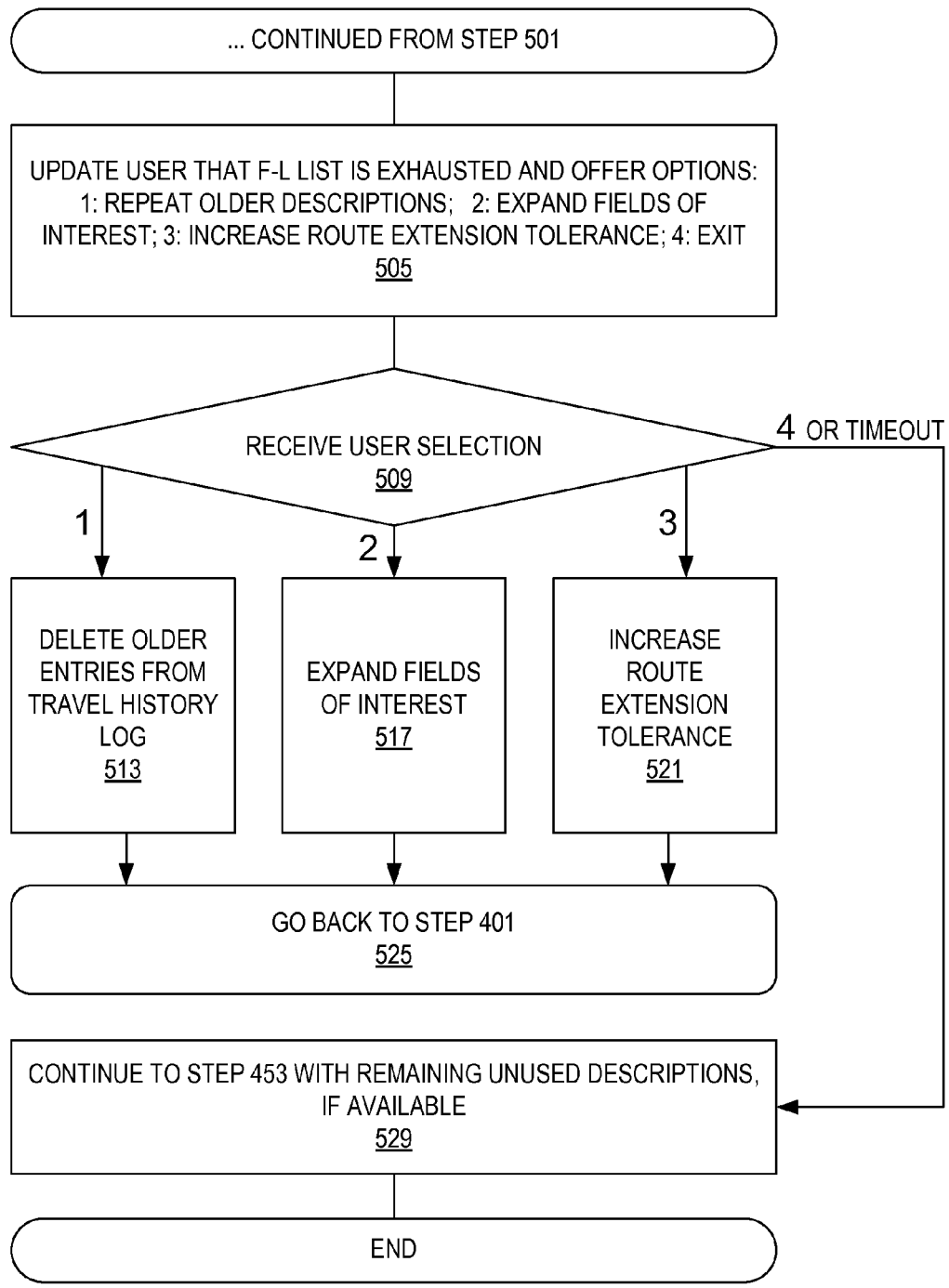
FIG. 8 illustrates a further extension of the method shown in FIG. 6 according to yet another embodiment of the present invention.
Figure 9:
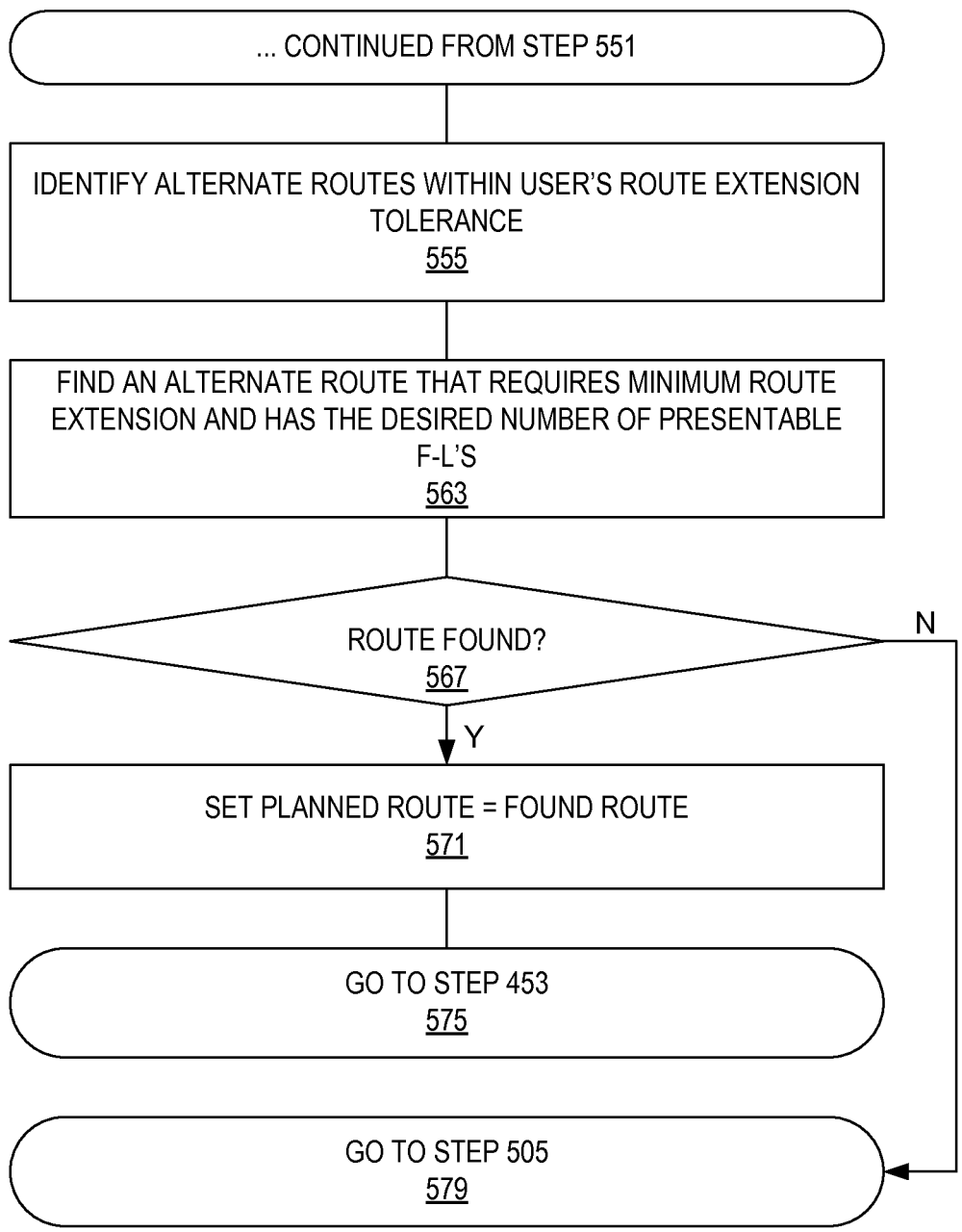
FIG. 9 illustrates another further extension of the method shown in FIG. 6 according to yet another embodiment of the present invention.

FIG. 8 illustrates a further extension of the method shown in FIG. 6 according to an embodiment of the present invention, following step 501 (FIG. 6), in the case that the list of featured locations is exhausted (i.e., less than the desired minimum). In a step 505 the user is given the following choices: (1) repeat older descriptions; (2) expand fields of interest; (3) increase route extension tolerance; or (4) exit without taking action. The user's choice is evaluated at a decision point 509, and: in the case of choice (1), a step 513 deletes older entries from the user's travel history log, effectively allowing reselection of the respective description for presentation (or just flagging older descriptions as available for fresh presentation); in the case of choice (2), in a step 517 the user expands the fields of interest; and in the case of choice (3), a step 521 increases the route extension tolerance. For cases (1), (2), and (3), a step 525 reverts to step 401 (FIG. 6). In the case of choice (4) or a timeout, a step 529 continues to step 453 (FIG. 7) if there are any unused descriptions available.

FIG. 9 illustrates another further extension of the method shown in FIG. 6 according to another embodiment of the present invention, following step 551. In a step 555 alternate routes within the user's specified route extension tolerance are identified. Of the identified alternate routes, an alternate route requiring the minimum route extension is found in a step 563. If such a route is found, a decision point 567 continues with a step 571, which sets the planned route to the found route, and then proceeds with a step 575 which goes to step 453 (FIG. 7). If such a route is not found, decision point 567 proceeds with a step 579 which goes to step 505 (FIG. 8).

Figure 10:
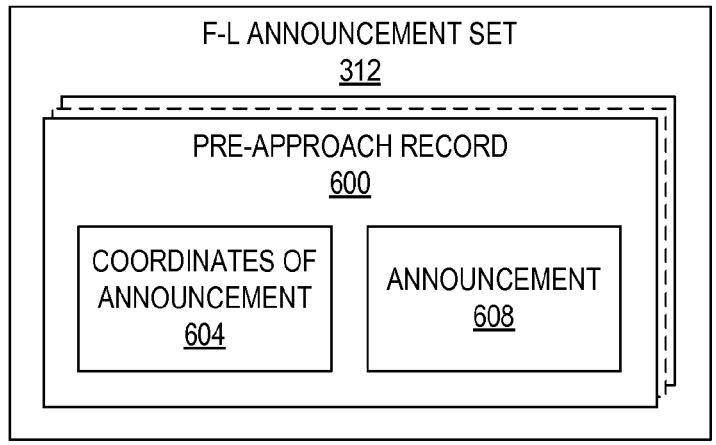
FIG. 10 conceptually illustrates a featured location announcement database and records thereof according to an embodiment of the present invention.

FIG. 10 conceptually illustrates a featured location announcement set 312 of FIG. 4. It will be noted that often a certain featured location can be approached via different routes and different directions. In order to call the user's attention so that he can view the featured location, or at least know where the featured location is in case that the featured location is not viewable from the route, announcements such as "two-hundred yards ahead of us on the left" or "the red building behind the white building in front of us" become very helpful. However, such announcements are dependent on the current particular route and direction of travel. Featured location announcement set 312 of FIG. 10 provides, for a certain featured location (see FIG. 4) one or more pre-approach records 600, each relating to a specific route and direction that can be used for passing next to the featured location. Pre-approach record 600 contains geographic coordinates 604 for the announcement and an announcement 608, such as an audio clip, which provides information as to where the featured location is or how it can be viewed, relative to the route and direction of current travel; thus, a certain featured location may have several different announcements for each route that passes through the featured location as well as the direction of travel.

Figure 11:
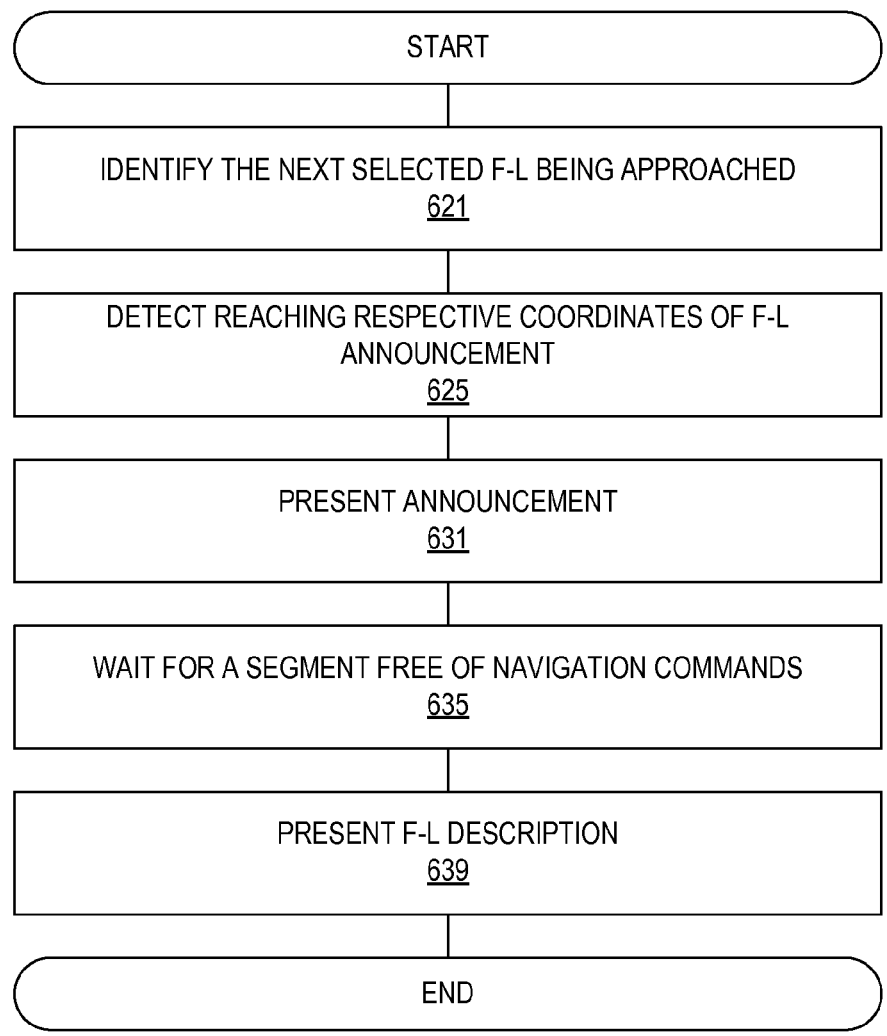
FIG. 11 illustrates a method for presenting a featured location description, according to an embodiment of the present invention.

A method according to a related embodiment is illustrated in FIG. 11, starting with a step 621, in which the next featured location being approached is identified, as well as the current route and direction of approaching the featured location, which also identify the particular pre-approach record 600 that relate to both the approached featured location and to the current route and direction used for approaching it. In a step 625 reaching geographic coordinates 604 is detected, in a step 631, announcement 608 is presented, and in a step 635 the method waits for a subsequent time segment without turn-by-turn navigation commands. Finally, in a step 639, the featured location description is presented to the user.

Figure 12:
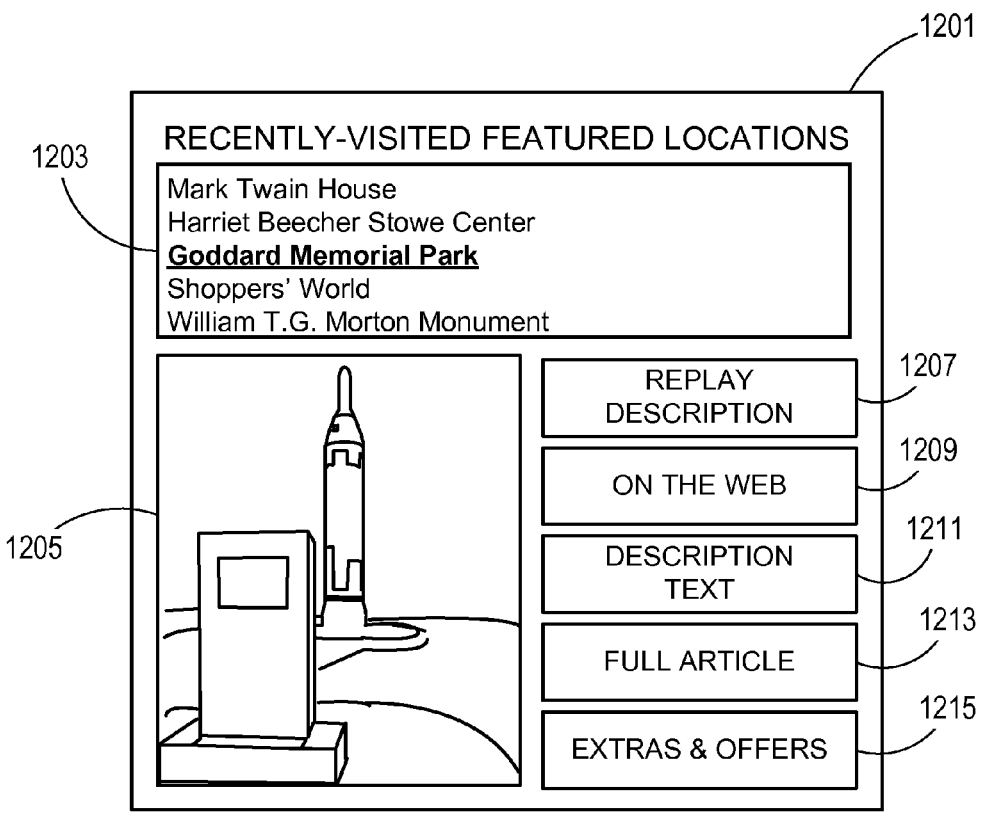
FIG. 12 illustrates user options for featured location descriptions according to an embodiment of the present invention.

FIG. 12 illustrates user options for accessing data about recently-visited featured location descriptions according to an embodiment of the present invention, in a user interface window 1201, for example when a user reaches his or her destination and is interested to hear again, or get further information, on a featured location he has just or recently visited. User interface window 1201 can be on any computer accessible to the user, such as a navigation device, smart phone, or any home, office or portable computer that can access featured location database 162 and travel history log 120 via network 170 (see FIG. 2). A pane 1203 displays a list of recently-visited featured locations, from which the user may select a featured location for details. In a non-limiting example, the selected featured location is shown in underlined bold in pane 1203 for purposes of illustration. In a related embodiment, a visual 1205 of the selected featured location is shown. In other related embodiments: a button 1207 replays the audio description—in effect, recreating the presentation; a button or link 1209 connects the user with a website relevant to the featured location; a button or link 1211 displays a text version of the description; a button or link 1213 displays a complete article or video related to the featured location; and a button or link 1215 presents the user with extra information and/or commercial offers connected with the featured location.

Figure 13:
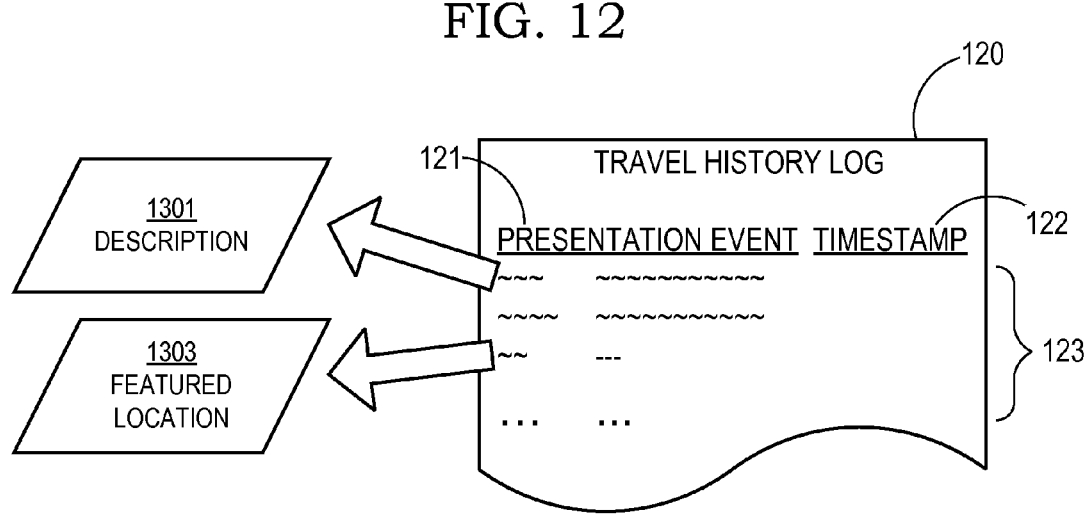
FIG. 13 conceptually illustrates a user travel history log according to an embodiment of the present invention.

FIG. 13 conceptually illustrates user travel history log 120 according to an embodiment of the present invention. Travel history log 120 includes a set of entries 123, each of which contains a presentation event 121 and a timestamp 122. In a related embodiment, timestamp 122 is omitted. Timestamp 122 is particularly useful in embodiments that allow replaying older descriptions, for example when newer descriptions are exhausted. In certain embodiments, presentation event 121 is a link, pointer, or identifier of a description 1301 and/or the respective featured location 1303. Description 1301 is typically an audio clip but may also contain general multimedia content, while featured location 1303 can be represented by an identifier or coordinates, that are recognizable in featured location database 162. In cases where featured location 1303 has only a single description 314 in the corresponding featured location record of database 162, the presentation event 122 may reference merely the featured location 1303.

Coordinating with Navigation

According to certain embodiments of the invention, the presentation of featured location descriptions is coordinated with turn-by-turn navigation to prevent interference with navigation instructions. In these embodiments, the presentation of a featured location description is deferred until a predicted time interval between two consecutive navigation instructions is sufficient to present the description. In a non-limiting example, a featured location description audio clip that has duration of fifteen seconds is presented between two consecutive navigation instructions that have a predicted time interval between them of thirty seconds. That is, there is a thirty-second window during which time no navigation instructions are predicted to be given to the user, so the fifteen-second featured location description audio clip can be presented to the user during this interval without affecting the delivery of navigation instructions.

In some embodiments of the invention, the user specifies preference 364 (FIG. 5) for the length of a description audio clip (FIG. 4, short 417, medium 418, and long 419), which is used as a default. If, however, the predicted time interval between navigation instructions is insufficient for the user's preference, a shorter description may be used instead.

Descriptions without Navigation Instructions

Most of the above disclosure related to the integration of presentation of featured locations with a navigation functionality that includes computerized route planning and turn-by-turn driving directions. It will be appreciated, however, that the presentation of featured location can work independently of navigation.

In a first example, the user is using a navigation device 174 that cooperates with navigation server 104 (FIG. 2), or, alternatively, navigation device 204 (FIG. 3), but finds turn-by-turn direction unnecessary and annoying, as long as he drives on his daily route to work. The turn-by-turn instructions, according to a preferred embodiment of the present invention, can be muted, unless there is a change in the route as a result of changing traffic conditions, while the featured locations are presented as described hereinabove (for example, see FIG. 7 with step 453 omitted).

In a second example, presentation of featured locations can work irrespective of navigation functionality, or even if navigation functionality is absent. System 100 of FIG. 2 will be used for illustrating the second example, with the navigation functionalities that are used to plan routes and produce turn-by-turn directions are eliminated, disabled, or just ignored for the purpose of the present discussion. As schematically described in FIG. 14, in a step 1401, the current location is read by location sensor 178. In a step 1405, featured location database 162 is searched, attempting to find a featured location that matches the user's preferences, is in the vicinity of the current location, and, according to the user's travel history log 120, has not been visited by the user before. If such featured location is found in step 1409, a description of the featured location is provided for presentation. If a description is not found in step 1409, then step 1421 attempts to find in location database 162 a previously-visited featured location that matches the user's preferences, is in the vicinity of the current location, and has at least one description that has not been presented before. If in step 1421 such description is found, then in step 1429 the description is provided for presentation to the user. If both step 1409 and step 1425 have found no description to present, then the process of FIG. 14 reverts to step 1401, where the current location, which changes as the user moves along his route, is read and steps 1405 and 1421 will seek again a featured location eligible for presentation in the vicinity of the current location. If a presentation has been made in either step 1413 or step 1429, then, preferably, in step 1433, a predefined delay (e.g. 5 minutes or 5 miles), according to the user's preferences, will be maintained for avoiding excessive number or frequency of presentations, and, after this delay has elapsed, the procedure will revert to step 1401, for seeking the next presentation opportunity.

Figure 14:
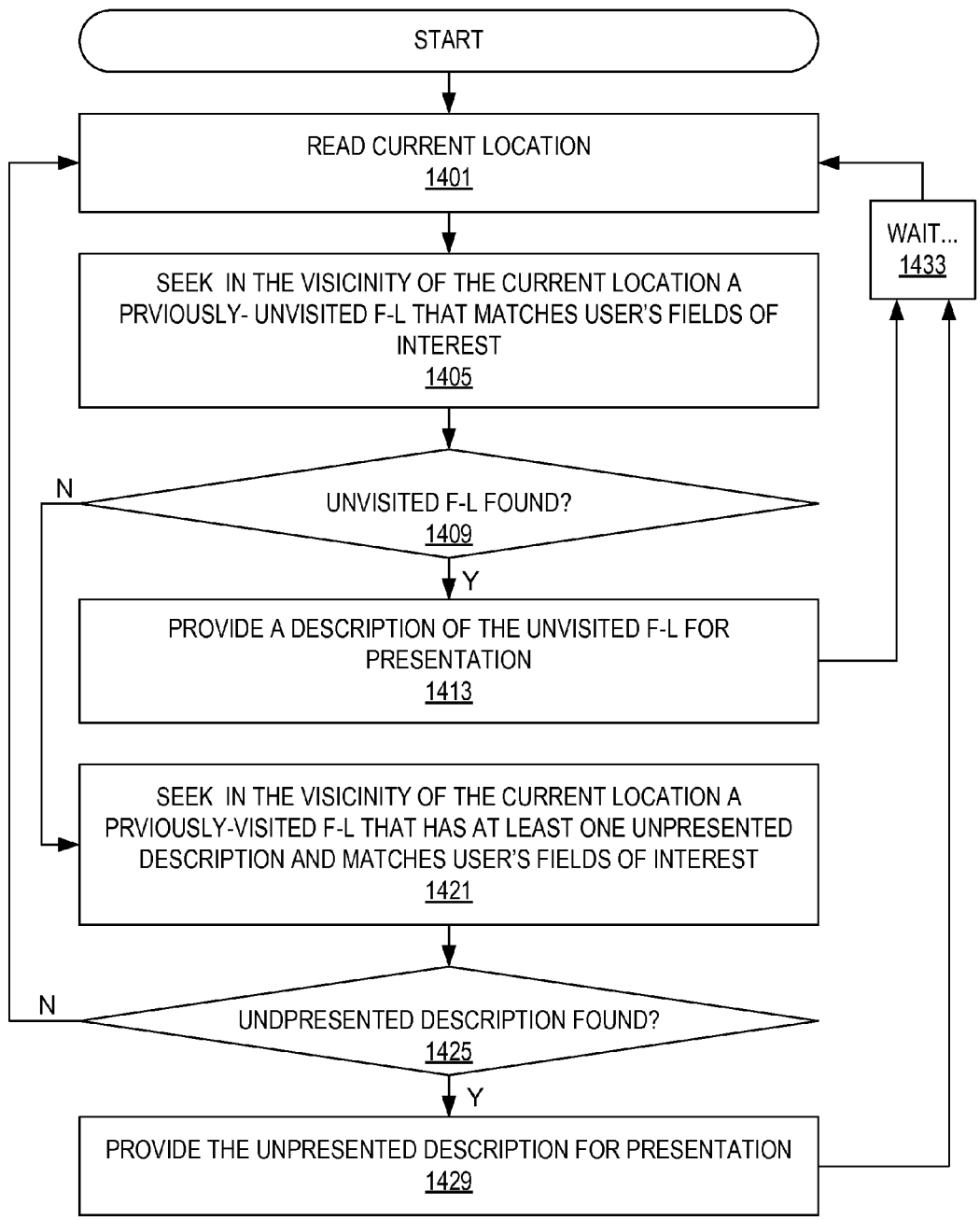
FIG. 14 illustrates a method according to an embodiment of the present invention for presenting a featured location description, independently of navigation functionality.

It will be appreciated that the process of FIG. 14 can be implemented for a user driving, walking or cycling in known or unknown routes, in connection with, independently of or in the absence of navigation functionality on the same or separate device. A particular example of interest is where a user uses a conventional navigation device that is built into his car, while the procedure of FIG. 14 provides the presentation of featured location functionalities according to the present disclosure, as an application installed in his smart phone.

Figure 15:
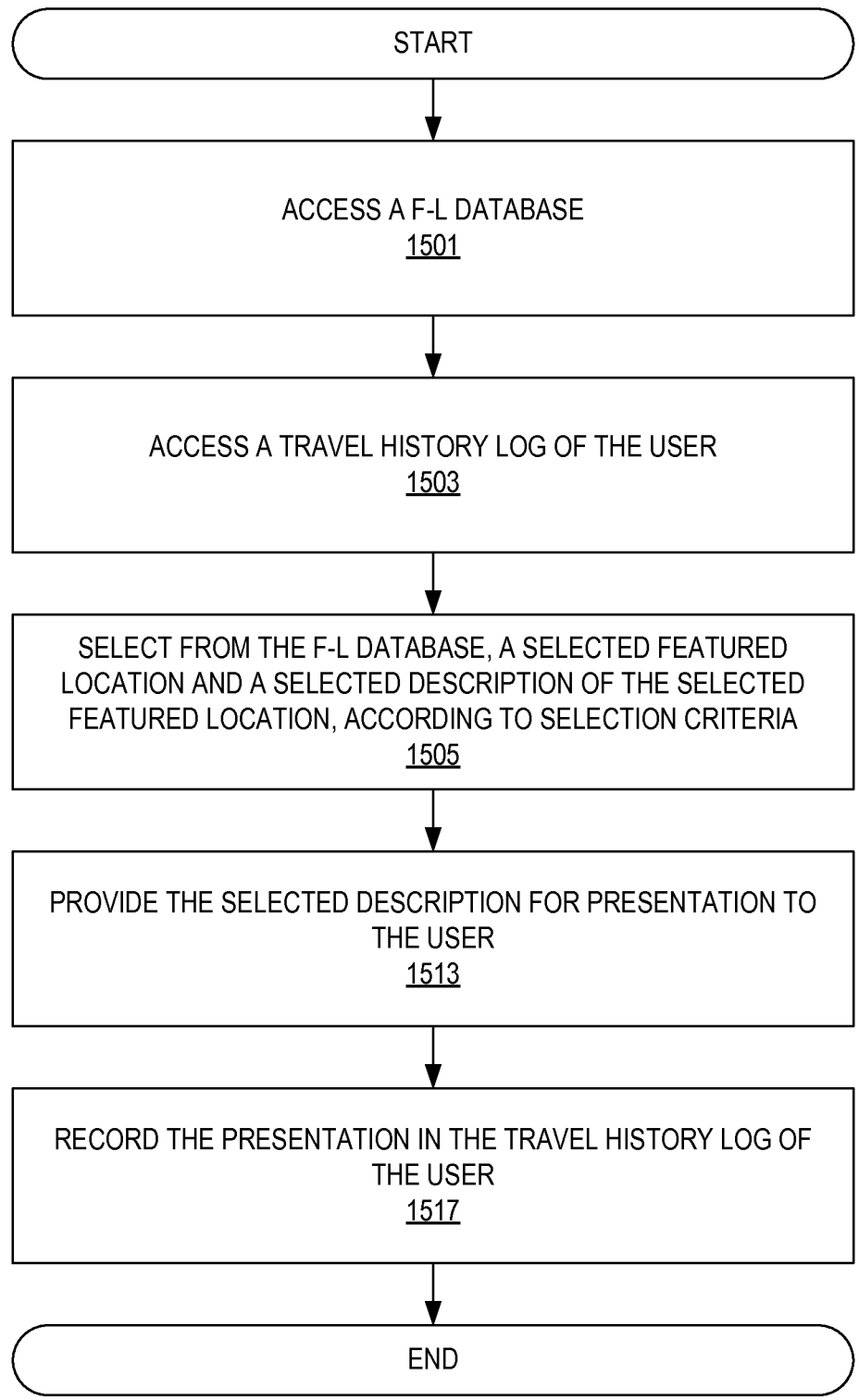
FIG. 15 illustrates a method according to an embodiment of the present invention.

FIG. 15 provides a concise summary of a method according to a preferred embodiment of the present invention. In step 1501, a processor accesses a featured location database that includes a plurality of featured locations and at least one description for each featured location. In step 1503, a travel history log of the user is accessed, the travel history log storing information (e.g. identifying featured location, description, timestamp) about past presentations of descriptions of featured location provided to the user. In step 1505, a processor selects, from the featured location database, a selected featured location and a selected description of the selected featured location, according to selection criteria that include, at least: (a) that the selected featured location is along the route, and (b) that, according to presentation criteria that are responsive to the travel history log of the user, the selected description of the selected featured location is presentable. A selected description of a selected featured location is considered presentable, for example, when any of the following is true: (i) the selected featured location is not recorded in the travel history log of the user; (ii) the latest record, in the travel history log of the user, that includes the selected featured location, has expired, i.e. is older than, for example, a year; (iii) the selected description is not recorded in the travel history log of the user; or (iv) the latest record, in the travel history log of the user, that includes the selected description, has expired.

In step 1513, the description is provided for presentation to the user. This can be implemented, for example, by a server sending the description, as a sound file or streaming sound, to a device of the user, or by a processor of a mobile device providing the description to its audio transducer. Preferably, the description is provided to the user when the user is in the vicinity of the featured location.

In step 1517, the presentation event is recorded in the travel history log of the user, for example, by recording the featured location identification or coordinates, the description identification, and the timestamp. This recording will serve subsequent executions of the method of FIG. 15 in avoiding repetitions of recently-presented descriptions upon the execution of step 1505.

Various embodiments enhance the method of FIG. 15, by the following features: (a) the selection criteria further include that the selected description complies with a preference of the user, for example preferring historical landmarks or commercial sites; (b) the description can be an ephemeral description, that will soon be removed from the database; (c) the method enhanced by providing navigation functionality, i.e. planning the route according to an origin point and a destination point and providing turn-by-turn navigation instructions for traveling along the route. In this case, the selection criteria of step 1505 may further include: that a time duration of the selected description is less than a predicted time interval between two consecutive turn-by-turn navigation instructions in the vicinity of the selected featured location; and/or, that a time interval between two consecutive presentations along the route is not less than a predetermined minimum time interval. The method of FIG. 15 can then be further enhanced by counting a number of featured locations along the route that comply with the selection criteria, and, if the counted number is below a user-defined minimum, replacing the route with an alternate route, such that: (i) the alternate route is within a predetermined user-defined journey extension tolerance, and (ii) the number of featured locations along the alternate route that comply with the selection criteria is greater than the counted number.

Reusing Descriptions

In various embodiments of the present invention, a description of a featured location includes a timestamp indicating when the description was presented to the user. In a related embodiment, a user can set a preference regarding reuse of a description. In this embodiment, the user specifies a preference for a "reusability age" of a description. Descriptions presented in the past that have a presentation age equal to or greater than the reusability age are eligible for reuse. In a non-limiting example, a user specifies a six-month reusability age for descriptions, in which case a description presented on a particular date (as tracked in travel history log 120) would become eligible for reuse six months after that date. In another embodiment of the invention, a reusability age is predetermined and cannot be modified by the user. In still another embodiment, a user can specify that no descriptions are eligible for reuse, regardless of their age. In a related embodiment, this is indicated within the system by setting the reusability age to infinity ($\infty$).

While the invention has been described with respect to a limited number of embodiments, it will be appreciated by persons skilled in the art that the present invention is not limited by what has been particularly shown and described herein. Rather the scope of the present invention includes both combinations and sub-combinations of the various features described herein, as well as variations and modifications which would occur to persons skilled in the art upon reading the specification and which are not in the prior art.

What is claimed is:

1. A computerized method for enhancing the travel experience of a user, the method comprising:
   planning, by a processor, a route according to an origin point and a destination point;
   accessing, by a processor, a featured location database, the database including a plurality of featured locations and at least one description for each featured location;
   accessing, by a processor, a travel history log of the user;
   counting, by a processor, the number of featured locations that are along the route and have a description that is presentable according to presentation criteria that are responsive to the travel history log of the user; and
   if the number is below a predefined minimum of at least two, then planning, by a processor, an alternate route between the origin point and the destination point, such that:
      the alternate route is within a predetermined route extension tolerance, and
      the count of featured locations, along the alternate route, that have a description that is presentable according to the presentation criteria, is greater than the number.

2. The method of claim 1, wherein the presentation criteria include at least one of:
   that the featured location having the description is not recorded in the travel history log of the user;
   that the latest record, in the travel history log of the user, that includes the featured location having the description, has expired;
   that the description is not recorded in the travel history log of the user; or
   that the latest record, in the travel history log of the user, that includes the description, has expired.

3. The method of claim 1, wherein the presentation criteria further include: that the description complies with a preference of the user.

4. The method of claim 1, further comprising:
   providing a description, that is presentable according to the presentation criteria, for presentation to the user; and
   recording the presentation in the travel history log of the user.

5. The method of claim 4, wherein said providing the description for presentation to the user is made when the user is in the vicinity of the featured location having the description.

6. The method of claim 1, wherein the description is an ephemeral description.

7. The method of claim 1, further comprising:
   planning turn-by-turn navigation instructions for traveling along the route.

8. The method of claim 7 wherein the presentation criteria include: that a time duration of the description is less than a predicted time interval between two consecutive turn-by-turn navigation instructions in the vicinity of the featured location having the description.

9. The method of claim 1, wherein the presentation criteria include: that a time interval between two consecutive presentations along the route is not less than a predetermined minimum time interval.

10. A server operative to enhance the travel experience of a user, the server comprising:
    a featured location database that includes a plurality of featured locations and at least one description for each featured location;
    a user database that includes a travel history log of the user; and
    a processor programmed to:
    plan a route according to an origin point and a destination point;
    count the number of featured locations that are along the route and have a description that is presentable according to presentation criteria that are responsive to the travel history log of the user; and
    if the number is below a predefined minimum of at least two, then plan an alternate route between the origin point and the destination point, such that:
       the alternate route is within a predetermined route extension tolerance, and
       the count of featured locations, along the alternate route, that have a description that is presentable according to the presentation criteria, is greater than the number.

11. The server of claim 10, wherein the presentation criteria include at least one of:
    that the featured location having the description is not recorded in the travel history log of the user;
    that the latest record, in the travel history log of the user, that includes the featured location having the description, has expired;
    that the description is not recorded in the travel history log of the user; or that the latest record, in the travel history log of the user, that includes the description, has expired.

12. The server of claim 10, wherein the presentation criteria include: that the description complies with a preference of the user.

13. The server of claim 10, wherein the processor is further programmed to:
   provide a description, that is presentable according to the presentation criteria, for presentation to the user; and
   record the presentation in the travel history log of the user.

14. The server of claim 13, wherein the processor is further programmed to:
   send to the device of the user turn-by-turn navigation instructions for traveling along the route.

15. The server of claim 14, wherein the presentation criteria include: that a time duration of the description is less than a predicted time interval between two consecutive turn-by-turn navigation instructions in the vicinity of the featured location having the description.

16. The server of claim 10, wherein the presentation criteria include: that a time interval between two consecutive presentations along the route is not less than a predetermined minimum time interval.

* * * * *